July 13, 1943.    J. H. REVELL    2,324,025
DENTAL TOOL GRINDER
Filed May 13, 1940
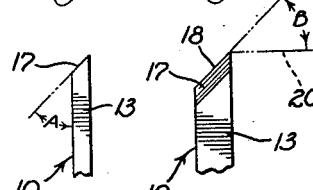
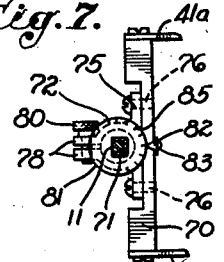
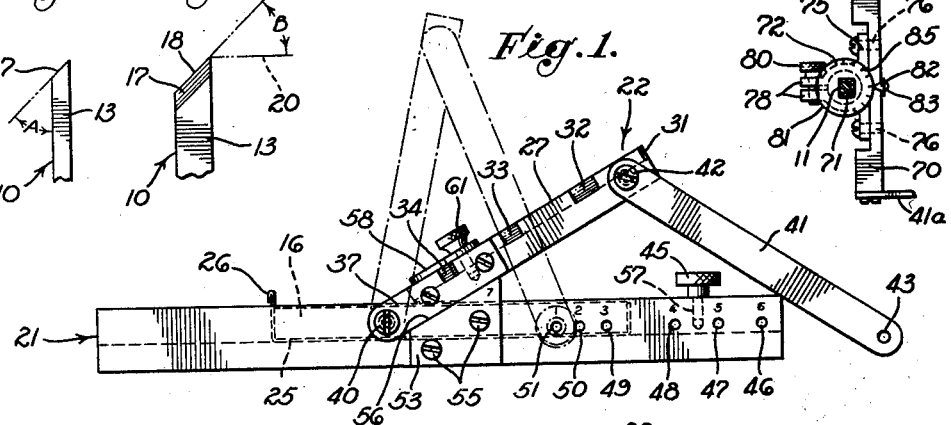
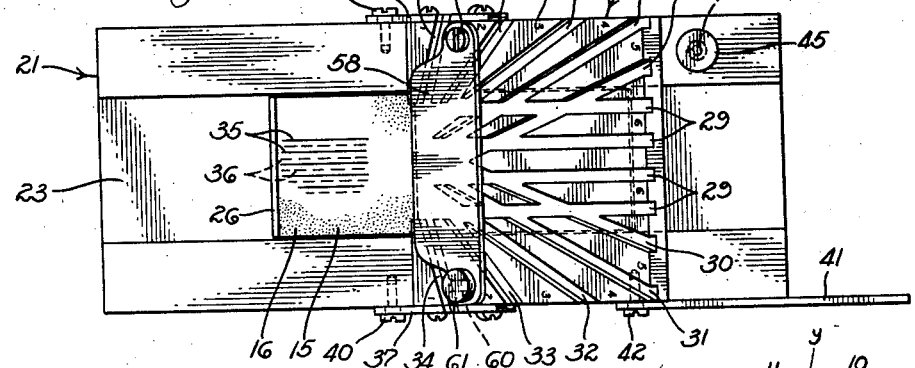
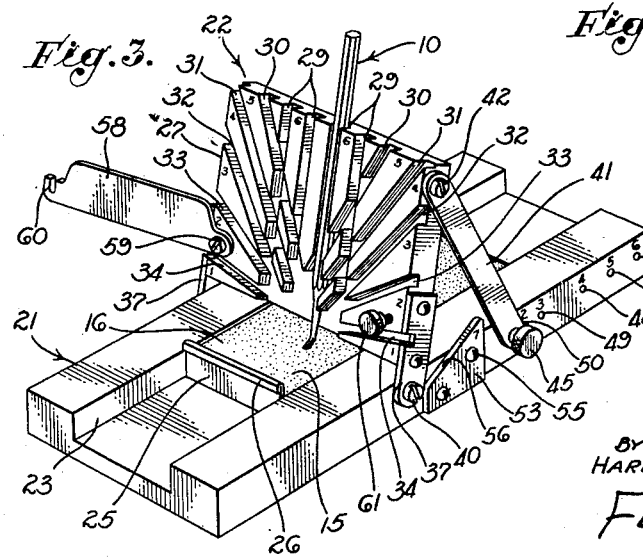
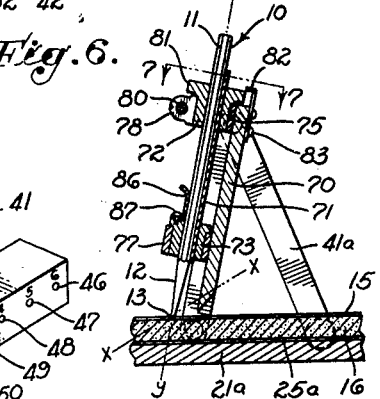
INVENTOR
JOHN H. REVELL
BY
HARRIS, KIECH, FOSTER & HARRIS
FOR THE FIRM
ATTORNEYS.

Patented July 13, 1943

2,324,025

UNITED STATES PATENT OFFICE 2,324,025

DENTAL TOOL GRINDER

John H. Revell, Alhambra, Calif.

Application May 13, 1940, Serial No. 334,787

6 Claims. (Cl. 51—59)

My invention relates to tool sharpening devices with special reference to grinding operations, and is directed particularly to a grinder especially designed for dental tools.

Some dental tools have cutting edges normal to the directions of the tool axes, but many have cutting edges oblique from normal. A typical set of dental instruments may include tools with cutting edges disposed at five different angles in both directions from normal to the tool axes. Since the cutting ends of dental tools are exceedingly small in cross section the precise angles to which dental tools are beveled and the obliqueness of the cutting edges are not readily ascertainable. Even when the desired angular values are known, it is difficult to hold a tool manually at the proper position for accurately sharpening an edge normal to the direction of the tool axis, and it is exceedingly difficult, if not impossible, to hold a dental tool in accurate position for sharpening an oblique cutting edge.

It has long been recognized that accurately ground cutting edges are essential for efficient and expeditious dental work, yet most dental-tool grinding is at present performed by hand without any mechanical aids whatsoever, and the grinding devices that have been available to dentists heretofore have not been designed to insure accurate grinding. Moreover, such devices have only tool rests to assist the operator in holding tools at grinding positions, there being no provision for positive guidance of tools at the numerous required angles.

A general object of the present invention is to provide a device for effectively and rapidly grinding dental tools to a high degree of accuracy without requiring any special skill or care on the part of the operator. A further object is to provide such a device that will grind with equal accuracy all the tools of a standard dental set. Since accurate grinding requires that the tools of a standard set be held precisely at certain angles of inclination relative to whatever abrasive surface is employed and at certain definite degrees of rotation about the tool axes, it is my object to provide such a device that is quickly and conveniently adjustable to predetermined tool-holding positions at standard angles and standard degrees of rotation. A further object is to provide such a device having index means to identify the various angular and rotative settings required for given tools.

Other objects will be apparent in the course of my detailed description.

In the drawing which is to be taken as illustrative only;

Fig. 1 is a side eluevation of the preferred form of my invention;

Fig. 2 is a plan view of the device shown in Fig. 1;

Fig. 3 is a perspective view of the same device;

Fig. 4 is a side view on an enlarged scale of the cutting portion of a dental tool;

Fig. 5 is a similar view with the dental tool rotated 90° from the position shown in Fig. 4;

Fig. 6 is a fragmentary longitudinal section of a second embodiment of my invention; and Fig. 7 is a section taken as indicated by the line 7—7 of Fig. 6.

The problem of properly sharpening a dental tool may be approached by considering a typical instrument such as the dental tool 10 shown in side elevation in Fig. 6. The tool is made of one piece of metal, has an octagonal handle portion 11, a tapered shank 12, and an end blade portion 13 which may or may not be slightly tapered, but in any event is rectangular in cross-sectional configuration. In describing the inclination of the dental tool relative to an abrasive surface, for example relative to the abrasive surface 15 of a grinding stone 16, reference may be made to the tool axis taken as the axis $x$—$x$ of the end portion 13 or taken as the axis $y$—$y$ of the handle portion 11.

Figs. 4 and 5 indicate how the rectangular end portion 13 of a typical dental tool has a bevel face 17 which in profile forms the bevel angle A. The bevel face 17 forms a cutting edge 18, the particular cutting edge shown in Fig. 5 being oblique. The obliqueness of the cutting edge 18 may be taken as the angle B which is measured from a transverse line 20 that is normal to the direction of the blade axis $x$—$x$ and may also be regarded as normal to the direction of the tool axis $y$—$y$.

Such a tool is applied at inclined disposition to the abrasive surface 15 for grinding. If sides of the rectangular cross-sectional configuration at the end portion 13 of the tool are parallel with a vertical plane defined by the inclined axis $x$—$x$, which is the same vertical plane as defined by the inclined axis $y$—$y$, the cutting edge 18 will be normal to the directions of both the axes, i. e., will coincide with the line 20 of Fig. 5 instead of intersecting the line. In such event the angle A that the bevel face 17 makes with the axis $x$—$x$ will, of course, be the same as the angle at which the axis $x$—$x$ is inclined relative to the abrasive surface 15 and it may be further noted that the bevel face of the tool will be substantially rectangular. If, on the other hand, sides of the rectangular cross-sectional configuration of the end portion 13 of the tool are not in the described parallel relation, the cutting edge will be oblique at some value of the angle B and the bevel face of the tool will be of rhombic configuration as shown in Fig. 5.

It is apparent that the obliqueness of the cutting edge depends upon the rotative position of the tool about its axis relative to a plane through the tool axis perpendicular to whatever abrasive surface is employed, either the axis $x-x$ or the axis $y-y$ being taken for reference. It is further apparent that the degree of obliqueness to which a cutting edge is ground may be varied by rotation of the tool about either the axis $x-x$ or the axis $y-y$, the selected axis being maintained stationary, or, in an alternate procedure, by swinging the tool to change the direction of either of the tool axes without rotation about the selected axis. It follows that a tool holder designed for adjustment to handle the various tools of a dental set may be based on changing from one grinding position to another by rotation about an axis of the tool or, in effect, by shifting the tool without axial rotation to change the direction of a tool axis. The preferred form of my dental-tool grinder is based on the latter concept, being constructed, in effect, to permit adjustment of a tool to various angles laterally of the grinder as well as various angles longitudinally.

Figs. 1, 2, and 3 show a base generally designated 21 on which is adjustably mounted a tool holder generally designated 22. One function of the base 21 is to movably support a grinding stone for either rotation or reciprocation to cause the abrasive surface of the grinding stone to move past the tool holder 22. The particular grinding stone 16 depicted in the drawing is of rectangular configuration and the required relative movement of the stone may be permitted by slidably mounting the stone in a longitudinal guide channel 23 formed in the base 21. In the preferred form of my invention the base 21 is cut from a metal plate, and to minimize frictional resistance to reciprocation of the stone 16 in the channel 23 I provide a smooth-finish sheet metal tray 25 for the stone, the sheet metal tray being dimensioned for sliding fit in the guide channel 23 and having a flange 26 at one end extending above the guide channel for manual actuation of the stone.

The tool holder 22 has the function of retaining dental tools at required positions for grinding contact with the abrasive surface 15, the various positions being differentiated from each other in the inclination of a dental tool relative to the abrasive surface longitudinally of the stone and/or the lateral inclination of the tool relative to the abrasive surface.

The particular tool holder 22 suggested by the drawing consists essentially of a relatively thick plate 27 that is movable forward and rearward to various degrees of inclination, the plate having various grooves or tool-receiving channels of depth and width to fit the octagonal handles of a standard set of tools. The plate 27 has at least one longitudinal tool channel, the axis of which lies in a vertical plane at all angular adjustments of the plate. For example, as shown in the drawing, the plate 27 may have four such longitudinal tool channels 29. Other tool channels are formed in the plate 27 at various degrees of lateral inclination away from the longitudinal tool channels 29. For example, inclining in each lateral direction are tool-holding channels 30, 31, 32, 33, and 34 in the order of progressive divergence from the longitudinal tool channels 29.

By providing four of the longitudinal tool channels 29 in spaced relation to each other and by aligning the remaining tool channels 30 to 34 to intersect the abrasive surface 15 at laterally spaced points, I provide a number of longitudinal grinding zones spaced laterally across the abrasive surface 15 to distribute wear on the stone. It is to be further noted as a feature of my invention that the pattern of tool channels provided by the plate 27 is not symmetrical relative to the grinding stone 16 so that points of contact on the stone corresponding to the various tool channels may be shifted by reversing the stone end-for-end. In other words, the distributed grinding zones on the grinding surface may be shifted by reversing the stone. Thus, in Fig. 2 the full lines 35 on the abrasive surface 15 may be the grinding zones corresponding to the various tool channels for one disposition of the grinding stone 16 and the dotted lines 36 offset from the full lines 35 may represent the zones of wear effective when the stone is reversed end-for-end. Since the stone is of flat rectangular configuration and may be reversed not only end-for-end but also top-for-bottom, it is apparent that the stone may be employed in four different dispositions providing four different sets of grinding zones.

For pivotally mounting the plate 27 on the base 21 for adjustment rearward and forward, the plate may be provided with bracket members 37 extending downward along each side of the base to pivot members 40, the pivot members being mounted in suitable bores in the base. Any suitably adjustable means may be provided to support the plate 27 at the various required angles. For example, in the preferred form of my invention an arm 41 is pivotally attached to one side of the plate 27 by a suitable screw 42, the arm having an aperture 43 at its lower end to receive a headed pin 45. The headed pin 45 is adapted for insertion selectively in six holes designated by numerals 46 to 51 inclusive. Preferably both the headed pin 45 and each of the holes 46—51 are tapered to insure tight connections.

The holes 46 to 51 are spaced for six different inclinations of the plate 27. A seventh and lowermost inclination is desired and a feature of my invention is that I avoid the necessity of using a relatively long base to provide such a seventh hole. Instead of employing a seventh hole, I mount a plate 53 on each side of the base 21 by suitable screws 55, each plate 53 having an upper edge 56 inclined for contact with the corresponding bracket member 37 to support the plate 27 at the desired relatively low angle. When the side plates 53 support the plate 27, as shown in Figs. 1 and 2, the headed pin 45 is not in service. At such time the headed pin may be inserted in a suitable bore 57 for storage until needed.

The various tool channels 29—34 are, by preference, sufficiently shallow to permit the operator in using the device to hold tools in the channels by thumb pressure. Preferably the tool channels are so shallow that the octagonal handle portions of tools extend forward from the face of the plate 27 so that, if desired, a clamping bar 58 may be employed to hold the tools in place for grinding. As shown in Figs. 2 and 3, one end of the clamping bar 58 is pivotally attached to the face of the plate 27 by a suitable screw 59, and the other end is provided with a recess 60 for releasable engagement with a suitable thumb screw 61. When the clamping bar is swung across a dental tool in one of the tool channels 29—34, the thumb screw 61 may be tightened to press the bar against the tool.

Included in my invention is the conception of disposing the tool channels 29—34 at lateral angles required for standard dental tools, disposing the holes 46—51 and the side plates 53 at positions corresponding to various angles of the plate 27 required for standard dental tools, and providing index means identifying the tool channels, holes, and side plates whereby the required adjustments for particular tools may be readily ascertained. For example, in the preferred practice of my invention as indicated in Fig. 3, I provide indicia on the plate 27 as follows:

Index numerals 1 to identify the two oppositely inclined tool channels 34; index numerals 2 to identify the two oppositely inclined tool channels 33; index numerals 3 to identify the two oppositely inclined tool channels 32; index numerals 4 to identify the two oppositely inclined tool channels 31; index numerals 5 to identify the two oppositely inclined tool channels 30; and index numerals 6 to identify the four longitudinal tool channels 29.

On the side of the base 21 I provide the following indicia:

Index numeral 6 identifying the hole 46; index numeral 5 identifying the hole 47; index numeral 4 identifying the hole 48; index numeral 3 identifying the hole 49; index numeral 2 identifying the hole 50; index numeral 1 identifying the hole 51; and index numeral 7 identifying one of the plates 53.

For the guidance of the operator, I provide a tabulation of the adjustments required for various dental tools. Such tabulation based on the above arrangement of indicia may be as follows:

| Instrument | Tool-channel | Hole |
|---|---|---|
| Weidelstats—mesial | 6 | 4 |
| Weidelstats—distal oo | 6 | 7 |
| Straight chisels | 6 | 5 |
| Bin angle—mesial | 6 | 3 |
| Bin angle—distal oo | 6 | 7 |
| Hatchets—left and right | 2 | 5 |
| G. M. trimmer—mes. 80 | 3 | 5 |
| G. M. trimmer—dis. 95 | 1 | 5 |
| Angle formers | 4 | 2 |
| May use for less angle | 5 | 2 |
| Hoes 6½—2½—9 | 6 | 1 |
| 10—4—8 | 6 | 1 |
| 10—14—14 reversed | 6 | 1 |
| 8—3—23 reversed | 6 | 6 |
| 4½—1½—23 reversed | 6 | 6 |
| 14—10—16 mes. rev | 6 | 3 |
| 14—10—16 dis. oo | (¹) | |
| Spec. hatchet 3—2—28 | (¹) | |

¹ Flat on base.

The various terms in the instrument column of this tabulation designate standard dental tools in the nomenclature employed by dentists and require no discussion here.

The manner in which the first form of my invention may be employed to sharpen various dental tools may be readily understood from the foregoing description. Preparatory to grinding a given tool, the operator adjusts the inclination of the plate 27 as required for the particular tool and then inserts the tool in the proper tool-holding channel in the plate. For example, if reference to the above tabulation reveals that the tool is to be inserted in one of the channels 6 and that the inclined plate 27 is to be supported by the headed pin 45 in hole No. 1, the device will be adjusted as shown in Fig. 3. The operator may then proceed with the grinding operation by grasping the flange 26 of the tray 25 with his right hand to reciprocate the grinding stone 16 under the tool. The operator may hold the tool in place in the course of grinding either by using the clamping bar 58 or by pressing the tool against the bottom of the tool channel with his left thumb. In either event, the operator will exert pressure against the protruding end of the tool, for example, by employing his left forefinger to urge the tool against the reciprocating stone. It is apparent that if the clamping bar is employed the thumb screw 61 must be turned only lightly to permit the tool to be urged toward the stone in the manner described. Obviously, the device may be made entirely automatic in the grinding operation by providing power means to reciprocate the stone and by either permitting the tool to press against the stone by gravitation or by providing yielding means to press the tool downward.

The modification of my invention suggested by Figs. 6 and 7 is based on the conception of adjustably rotating the tool about the axis y—y instead of placing the tool in a selected one of several tool-channels. In this form of the invention the grinding stone 16 is mounted in a tray 25a in a base 21a, as heretofore described, and a plate 70 corresponding to the plate 27 is pivotally mounted on the base 21a and adjustably supported by an arm 41a in the previously described manner. A channel member 71 is mounted in an upper cylindrical member 72 and a lower cylindrical member 73, the channel member extending through suitable longitudinal bores in the two cylindrical members and being rigidly connected to the cylindrical members to form a unitary assembly. The upper cylindrical member 72 is journaled in a bearing member 75 that is anchored to the plate 70 by screws 76 and the lower cylindrical member 73 in like manner is journaled in a second bearing member 77 whereby the assembly consisting of the channel member and the two cylindrical members may be rotated to selected tool-grinding positions.

Suitable means is provided to releasably hold the assembly at various rotative positions. For example, the upper bearing member 75 may be of split construction forming two ends 78 that are adjustably interconnected by a manually operable clamping screw 80. For convenience of the operator in rotating the channel member 71 the upper cylindrical member 72 may have a knurled flange 81.

The index means in this second form of my invention may include a pointer 82 mounted on the plate 70 by screws 83 and a series of radial index marks 85 on the upper cylindrical member 72 to designate various rotative positions of the channel member relative to the pointer. These index marks have many index numerals corresponding to the previous index numerals on the face of the plate 27 so that the tabulation given above may be employed by the operator.

This second embodiment of the invention is operated in the same manner as the first embodiment. The operator may hold a dental tool in the channel member 71 manually, or may rely on some mechanical retaining means such as a suitable leaf spring 86 mounted on the lower cylindrical member 73 by suitable screws 87, the leaf spring being adapted to press against a dental tool as shown in Fig. 6.

The specific forms of my invention described herein for the purpose of disclosure and to illustrate the principles involved will suggest to those skilled in the art various changes, modifications, and substitutions that do not depart from my underlying concept. I reserve the right to all such changes, modifications, and substitutions that properly come within the scope of my appended claims.

I claim as my invention:

1. A dental-tool grinder having: a base; a grinding stone reversibly mounted for longitudinal reciprocation on said base, said stone having a grinding surface parallel with the direction of reciprocation; a tool support adjacent the path of movement of said stone and in a plane cutting said direction of reciprocation; and a plurality of means fixed relative to said tool support to retain tools on said tool support at a plurality of positions disposed and spaced to cause tools to contact the grinding surface of said stone at a plurality of longitudinal grinding zones distributed across said grinding face, the distribution of said positions being unsymmetrical relative to the longitudinal axis of said stone whereby the effective grinding zones on the surface of said stone are shifted when the stone is reversed.

2. A dental-tool grinder having: a grinding stone; a base movably supporting said stone; an inclined tool-holder extending toward said stone, said tool-holder providing a plurality of channels dimensioned to slidingly retain dental tools, said channels being at various lateral angles required for various dental tools; and means supporting said tool-holder on said base, said means being adjustable to support said tool-holder at selected angles of inclination relative to said grinding stone.

3. A dental-tool grinder as set forth in claim 2 in which said channels are shorter than dental tools to permit the handle ends of tools to extend beyond the ends of the channels whereby an operator may exert pressure on the ends of tools in the channels to urge the tools axially towards said stone.

4. A dental-tool grinder having: a grinding stone; a base movably supporting said stone; an inclined tool-holder extending over said stone, the lower end of said tool-holder being pivotally connected to said base, said tool-holder providing a plurality of channels dimensioned to slidingly retain dental tools, said channels being at various lateral angles required for various dental tools and being in depth less than the thickness of said tools whereby tools may be retained therein by finger pressure; and means supporting said tool-holder on said base, said means being adjustable to support said tool-holder at selected angles of inclination relative to said grinding stone.

5. A dental-tool grinder having: a base; a grinding stone mounted on said base for grinding movement; a tool support near said stone, said tool support determining a tool-support plane and being adjustable for movement in a plane perpendicular to the stone to various angles relative to the stone; and means on said tool support for holding dental tools at selected positions in said tool-support plane at predetermined angles relative to said perpendicular plane.

6. A dental-tool grinder having: a base; a grinding stone mounted on said base for grinding movement; a tool support adjacent the path of movement of said stone, said tool support being adjustable to various angles relative to the stone, and having a plurality of channels dimensioned to slidingly retain dental tools, said channels being at various angles across the tool support required for various dental tools and being in depth less than the thickness of said tools whereby the tools may be retained therein by finger pressure; and means on said tool support extending across portions of said channels in spaced relation thereto to slidingly retain tools in the channels.

JOHN H. REVELL.